US011120734B2

(12) United States Patent
Bae et al.

(10) Patent No.: US 11,120,734 B2
(45) Date of Patent: *Sep. 14, 2021

(54) METHOD AND ELECTRONIC DEVICE FOR SWITCHING OPERATING MODE OF DISPLAY

(71) Applicant: Samsung Electronics Co., Ltd., Suwon-si (KR)

(72) Inventors: Jong Kon Bae, Seoul (KR); Dong Hwy Kim, Hwaseong-si (KR); Hyun Jun Park, Yongin-si (KR); Hong Kook Lee, Seoul (KR); Dong Kyoon Han, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,720

(22) Filed: Feb. 3, 2020

(65) Prior Publication Data

US 2020/0175914 A1 Jun. 4, 2020

Related U.S. Application Data

(63) Continuation of application No. 16/107,256, filed on Aug. 21, 2018, now Pat. No. 10,553,149.

(30) Foreign Application Priority Data

Aug. 21, 2017 (KR) ........................ 10-2017-0105710

(51) Int. Cl.
*G06F 3/041* (2006.01)
*G09G 3/32* (2016.01)

(52) U.S. Cl.
CPC ....... *G09G 3/32* (2013.01); *G09G 2300/0842* (2013.01); *G09G 2300/0861* (2013.01);
(Continued)

(58) Field of Classification Search
CPC .......... G06F 3/041; G06F 3/045; G06F 3/043; G06F 3/01; G01R 27/26
See application file for complete search history.

(56) References Cited

U.S. PATENT DOCUMENTS 7,355,570 B2 4/2008 Choi
8,698,854 B2 4/2014 Lee
(Continued)

FOREIGN PATENT DOCUMENTS

KR 10-2005-0038261 A 4/2005
KR 10-0894606 B1 4/2009
(Continued)

OTHER PUBLICATIONS

Supplementary European Search Report in connection with European Application No. 18849058.5 dated Apr. 3, 2020, 10 pages.
(Continued)

*Primary Examiner* — Pegeman Karimi

(57) ABSTRACT

An electronic device includes a display panel, a first power regulator to supply first power to an anode of light emitting diode and second power to a cathode of the light emitting diode, and a DDI including a second power regulator to supply third power to the anode of the light emitting diode and fourth power to the cathode of the light emitting diode, and connected with the first power regulator, and a processor. The processor outputs first content based on the first power and the second power, in a first operating mode, outputs second content based on the third power and the fourth power, in a second operating mode, and controls the third power to be higher than the first power, and the fourth power to be higher than the second power, when an operating mode is switched.

20 Claims, 7 Drawing Sheets

(52) U.S. Cl.
CPC . *G09G 2310/08* (2013.01); *G09G 2320/0673* (2013.01); *G09G 2330/021* (2013.01); *G09G 2330/028* (2013.01)

(56) References Cited

U.S. PATENT DOCUMENTS

| | | | | |
|---|---|---|---|---|
| 9,041,626 | B2 | 5/2015 | Park et al. | |
| 9,099,033 | B2 | 8/2015 | Son et al. | |
| 9,241,387 | B2 * | 1/2016 | Shin | H05B 45/60 |
| 10,483,755 | B2 | 11/2019 | Park | |
| 2005/0083258 | A1 | 4/2005 | Choi | |
| 2008/0136342 | A1 | 6/2008 | Tamegai et al. | |
| 2009/0109147 | A1 | 4/2009 | Park et al. | |
| 2011/0205202 | A1 * | 8/2011 | Son | G09G 3/3208 345/207 |
| 2012/0127213 | A1 | 5/2012 | Park | |
| 2012/0161637 | A1 | 6/2012 | Lee et al. | |
| 2013/0082910 | A1 | 4/2013 | Lee | |
| 2013/0335396 | A1 | 12/2013 | Kim | |
| 2014/0028651 | A1 * | 1/2014 | Choi | G09G 3/14 345/212 |
| 2014/0118229 | A1 * | 5/2014 | Han | G09G 3/3233 345/82 |
| 2014/0362072 | A1 | 12/2014 | Park | |
| 2016/0179179 | A1 * | 6/2016 | An | G06F 1/3296 345/212 |
| 2018/0061322 | A1 * | 3/2018 | Yim | G09G 3/3208 |

FOREIGN PATENT DOCUMENTS

| | | | |
|---|---|---|---|
| KR | 10-2011-0097049 | A | 8/2011 |
| KR | 10-1323390 | B1 | 10/2013 |
| KR | 10-2015-0078714 | A | 7/2015 |
| KR | 10-2016-0074847 | A | 6/2016 |

OTHER PUBLICATIONS

International Search Report dated Dec. 11, 2018 in connection with International Patent Application No. PCT/KR2018/009515, 3 pages.

Communication pursuant to Article 94(3) EPC dated May 14, 2021 in connection with European Application No. 18849058.5, 9 pages.

* cited by examiner

METHOD AND ELECTRONIC DEVICE FOR SWITCHING OPERATING MODE OF DISPLAY

CROSS-REFERENCE TO RELATED APPLICATIONS AND CLAIM OF PRIORITY

This application is a continuation of application Ser. No. 16/107,256, filed Aug. 21, 2018, which claims priority to Korean Patent Application No. 10-2017-0105710, filed Aug. 21, 2017, the disclosures of which are incorporated by reference herein their entirety.

BACKGROUND

1. Field

The present disclosure relates to a method and an electronic for switching an operating mode of a display.

2. Description of Related Art

Recently, various types of electronic devices, such as a smartphone, and tablet personal computers (PC), have been widely spread with the development of an information technology. Such an electronic device may perform various functions, such as taking a photo or a moving picture, reproducing of a music file, a moving picture file, or a game, or web-browsing, by using a display.

Recently, an always on display (AOD) function has been developed such that the electronic device outputs specified information through the display even if a user does not handle the electronic device. The AOD function is a function allowing the electronic device to output information, such as a date or time, to the display under lower power even after the user turns off the screen of the electronic device. The operating modes of the display of the electronic device having the function may be divided into a normal mode and an AOD mode.

The above information is presented as background information only to assist with an understanding of the present disclosure. No determination has been made, and no assertion is made, as to whether any of the above might be applicable as prior art with regard to the present disclosure.

SUMMARY

The operating modes of a display may be set to be executed under mutually different power in the electronic device. For example, the normal mode is set to be executed by a first power source effective at supporting a higher-brightness display screen or a display screen having turned-on pixels at a higher contrast ratio. The AOD may be set to be executed by a second power source effective at supporting a lower-brightness display screen. Accordingly, when the operating modes are switched, the first power source and the second power source supplying power to the display panel may also be switched.

In some cases, mutually different power sources for switching between the operating modes may not seamlessly switch to each other and a rush current component may occur in a current flowing through the display panel. Accordingly, when the screen for the AOD is set to a high-brightness display screen or a display screen having turned-on pixels at a higher ratio, an abnormal screen may be output when switching from the screen for the normal mode to the screen for the AOD. To solve the problem, a black screen may be intentionally output while the operating modes are switching. However, this method can fail to provide a seamless appearing switch between screens.

Certain embodiments according to the present disclosure address at least the above-mentioned problems and/or disadvantages and provide at least the advantages described below. Accordingly, some embodiments according to the present disclosure provide a method and an electronic device for seamlessly switching an operating mode of a display of the electronic device.

In certain embodiments, an electronic device may include a display panel including at least one pixel including at least one light emitting diode, a first power regulator to supply first power to an anode of the at least one light emitting diode and to supply second power to a cathode of the at least one light emitting diode, and a display driver integrated circuit (DDI) including a second power regulator to supply third power to the anode of the at least one light emitting diode and to supply fourth power to the cathode of the at least one light emitting diode, and electrically connected with the first power regulator, and a processor electrically connected with the first power regulator and the DDI. The processor may control the first power regulator such that the display panel outputs first content based on the first power and the second power, in a first operating mode, may control the DDI such that the display panel outputs second content different from the first content based on the third power and the fourth power, in a second operating mode, and may control the first power regulator and the DDI such that a voltage value of the third power is maintained to be higher than a voltage value of the first power, and a voltage value of the fourth power is maintained to be higher than a voltage value of the second power for at least specified time, when an operating mode is switched from the first operating mode to the second operating mode.

In various embodiments according to the present disclosure, an electronic device may include a display panel including at least one pixel including at least one light emitting diode, a first power regulator to supply first power to an anode of the at least one light emitting diode and to supply second power to a cathode of the at least one light emitting diode, a DDI including a second power regulator to supply third power to the anode of the at least one light emitting diode and to supply fourth power to the cathode of the at least one light emitting diode, and electrically connected with the first power regulator, and a processor electrically connected with the first power regulator and the DDI. The processor may control the first power regulator such that the display panel outputs first content based on the first power and the second power, in a first operating mode, may control the DDI such that the display panel outputs second content different from the first content based on the third power and the fourth power, in a second operating mode, and may control a short detection function of the first power regulator for specified time to prevent a current flowing through the at least one light emitting diode from being blocked, when an operating mode is switched from the second operating mode to the first operating mode.

According to some embodiments of the disclosure, in an electronic device having at least two display operating modes distinguished therebetween, the switching of the operating mode may be seamlessly performed. In addition, the switching between power sources may be seamlessly performed when the switching between the operating modes is made. Accordingly, the probability of output an abnormal screen to the display of the electronic device may be reduced. Besides, a variety of effects directly or indirectly understood through the present disclosure may be provided.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 illustrates operations of a method for switching from the second operating mode to the first operating mode by an electronic device, according to.

In the following description made with respect to the accompanying drawings, similar components will be assigned with similar reference numerals.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
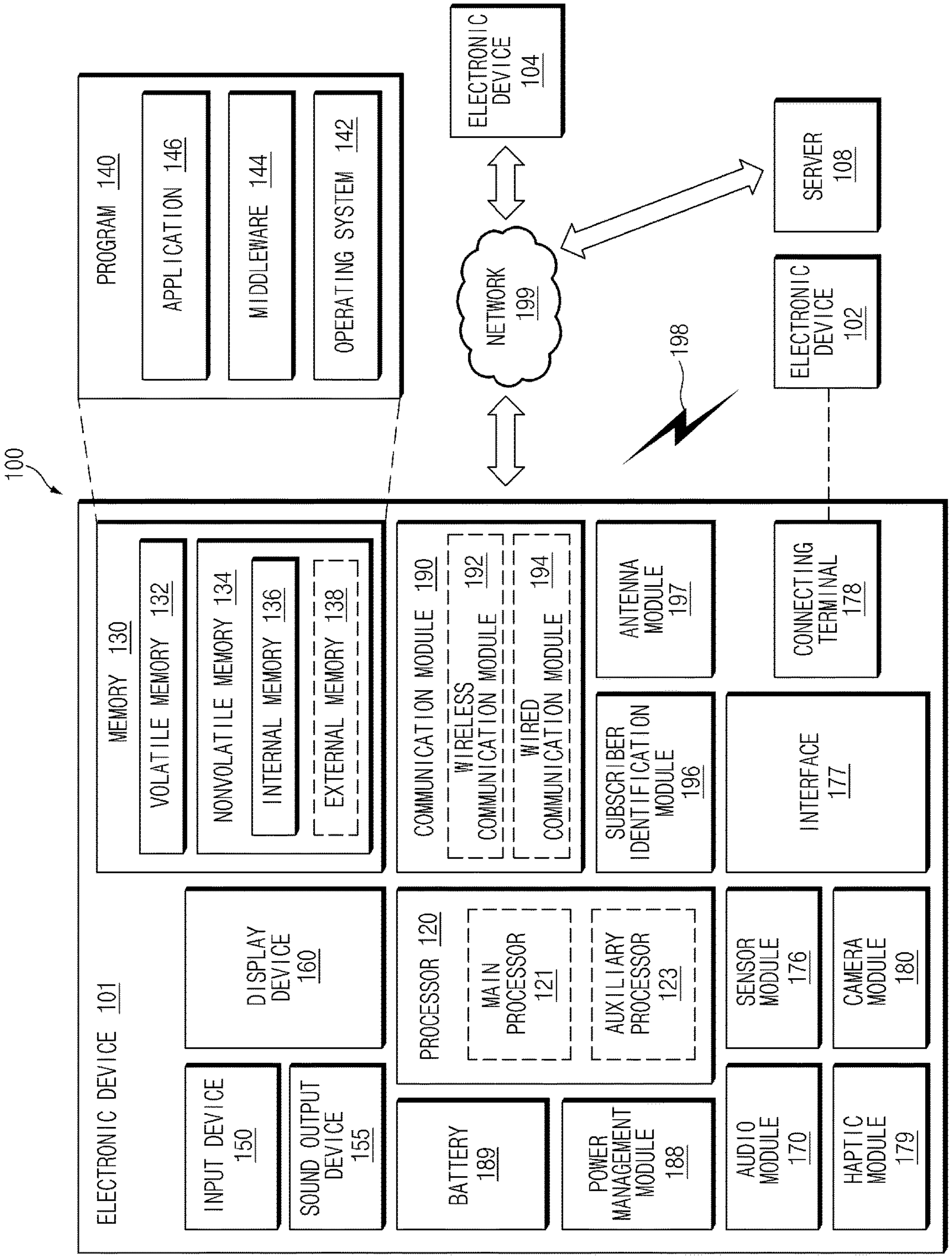
FIG. 1 illustrates, in block diagram format, an electronic device in a network environment for switching an operating mode of a display, according to various embodiments of this disclosure.

FIG. 1 illustrates, in block diagram format, an electronic device in a network environment for switching an operating mode of a display, according to various embodiments.

Referring to the non-limiting example of FIG. 1, an electronic device 101 may communicate with an electronic device 102 through a first network 198 (e.g., a short-range wireless communication) or may communicate with an electronic device 104 or a server 108 through a second network 199 (e.g., a long-distance wireless communication) in a network environment 100. According to various embodiments, the electronic device 101 may communicate with the electronic device 104 through the server 108. According to some embodiments, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. According to some embodiments, at least one (e.g., the display device 160 or the camera module 180) among components of the electronic device 101 may be omitted or other components may be added to the electronic device 101. According to some embodiments, some components may be integrated and implemented as in the case of the sensor module 176 (e.g., a fingerprint sensor, an iris sensor, or an illuminance sensor) embedded in the display device 160 (e.g., a display).

The processor 120 may operate, for example, software (e.g., a program 140) to control at least one of other components (e.g., a hardware or software component) of the electronic device 101 connected to the processor 120 and may process and compute a variety of data. The processor 120 may load a command set or data, which is received from other components (e.g., the sensor module 176 or the communication module 190), into a volatile memory 132, may process the loaded command or data, and may store result data into a nonvolatile memory 134. According to certain embodiments, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121, additionally or alternatively uses less power than the main processor 121, or is specified to a designated function. In this case, the auxiliary processor 123 may operate separately from the main processor 121 or embedded.

In this case, the auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to various embodiments, the auxiliary processor 123 (e.g., the image signal processor or the communication processor) may be implemented as a part of another component (e.g., the camera module 180 or the communication module 190) that is functionally related to the auxiliary processor 123. The memory 130 may store a variety of data used by at least one component (e.g., the processor 120 or the sensor module 176) of the electronic device 101, for example, software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may be a device for receiving a command or data, which is used for a component (e.g., the processor 120) of the electronic device 101, from an outside (e.g., a user) of the electronic device 101 and may include, for example, a microphone, a mouse, or a keyboard.

The sound output device 155 may be a device for outputting a sound signal to the outside of the electronic device 101 and may include, for example, a speaker used for general purposes, such as multimedia play or recordings play, and a receiver used only for receiving calls. According to some embodiments, the receiver and the speaker may be either integrally or separately implemented.

The display device 160 may be a device for visually presenting information to the user and may include, for example, a display, a hologram device, or a projector and a control circuit for controlling a corresponding device. According to certain embodiments, the display device 160 may include a touch circuitry or a pressure sensor for measuring an intensity of pressure on the touch.

The audio module 170 may convert a sound and an electrical signal in dual directions. According to various embodiments, the audio module 170 may obtain the sound through the input device 150 or may output the sound through an external electronic device (e.g., the electronic device 102 (e.g., a speaker or a headphone)) wired or wirelessly connected to the sound output device 155 or the electronic device 101.

The sensor module 176 may generate an electrical signal or a data value corresponding to an operating state (e.g., power or temperature) inside or an environmental state outside the electronic device 101. The sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support a designated protocol wired or wirelessly connected to the external electronic device (e.g., the electronic device 102). According to some embodiments, the interface 177 may include, for example, an HDMI (high-definition multimedia interface), a USB (universal serial bus) interface, an SD card interface, or an audio interface.

A connecting terminal 178 may include a connector that physically connects the electronic device 101 to the external electronic device (e.g., the electronic device 102), for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. The haptic module 179 may include, for example, a motor, a piezoelectric element, or an electric stimulator.

The camera module 180 may shoot a still image or a video image. According to certain embodiments, the camera module 180 may include, for example, at least one lens, an image sensor, an image signal processor, or a flash.

The power management module 188 may be a module for managing power supplied to the electronic device 101 and may serve as at least a part of a power management integrated circuit (PMIC).

The battery 189 may be a device for supplying power to at least one component of the electronic device 101 and may include, for example, a non-rechargeable (primary) battery, a rechargeable (secondary) battery, or a fuel cell.

The communication module 190 may establish a wired or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the wired communication or the wireless communication. According to various embodiments, the communication module 190 may include a wireless communication module 192 (e.g., a cellular communication module, a short-range wireless communication module, or a GNSS (global navigation satellite system) communication module) or a wired communication module 194 (e.g., an LAN (local area network) communication module or a power line communication module) and may communicate with the external electronic device using a corresponding communication module among them through the first network 198 (e.g., the short-range communication network such as a Bluetooth, a WiFi direct, or an IrDA (infrared data association)) or the second network 199 (e.g., the long-distance wireless communication network such as a cellular network, an internet, or a computer network (e.g., LAN or WAN)). The above-mentioned various communication modules 190 may be implemented into one chip or into separate chips, respectively.

According to some embodiments, the wireless communication module 192 may identify and authenticate the electronic device 101 using user information stored in the subscriber identification module 196 in the communication network.

The antenna module 197 may include one or more antennas to transmit or receive the signal or power to or from an external source. According to certain embodiments, the communication module 190 (e.g., the wireless communication module 192) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to various embodiments, the command or data may be transmitted or received between the electronic device 101 and the external electronic device 104 through the server 108 connected to the second network 199. Each of the electronic devices 102 and 104 may be the same or different types as or from the electronic device 101. According to some embodiments, all or some of the operations performed by the electronic device 101 may be performed by another electronic device or a plurality of external electronic devices. When the electronic device 101 performs some functions or services automatically or by request, the electronic device 101 may request the external electronic device to perform at least some of the functions related to the functions or services, in addition to or instead of performing the functions or services by itself. The external electronic device receiving the request may carry out the requested function or the additional function and transmit the result to the electronic device 101. The electronic device 101 may provide the requested functions or services based on the received result as is or after additionally processing the received result. To this end, for example, a cloud computing, distributed computing, or client-server computing technology may be used.

Figure 2:
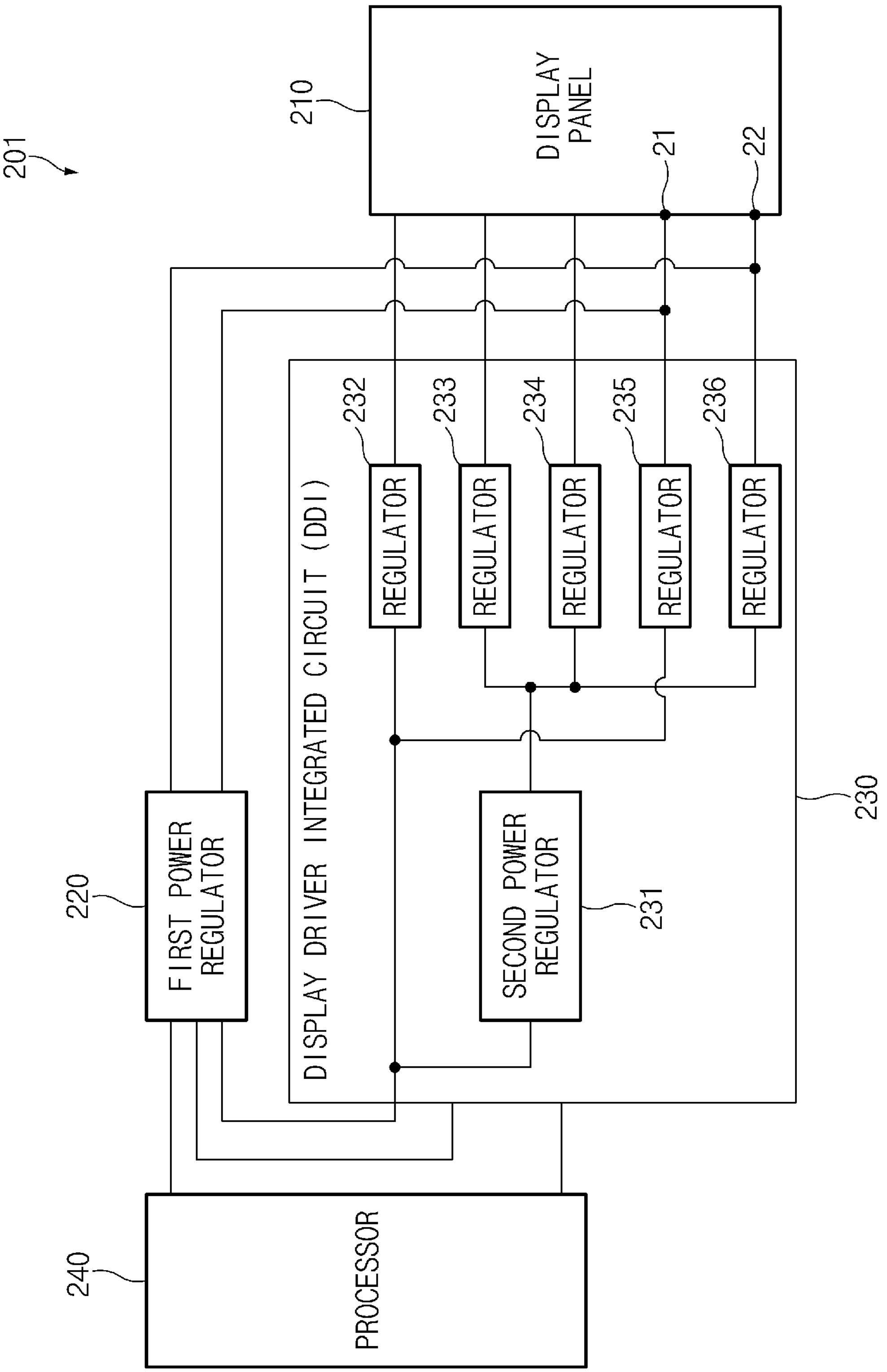
FIG. 2 illustrates, in block diagram format, an according to some embodiments of the present disclosure.

FIG. 2 illustrates, in block diagram format, an electronic device, according to certain embodiments of the present disclosure.

Referring to the non-limiting example of FIG. 2, an electronic device 201 (e.g., the electronic device 101 of FIG. 1) may include a display panel 210, a first power regulator 220, a display driver integrated circuit (DDI) 230, and a processor 240. According to various embodiments, the electronic device 201 may be implemented without some components of the above-described components or may be implemented by additionally including one or more components not illustrated in drawings. For example, the electronic device 201 may further include a touch sensor and/or a memory. For another example, the electronic device 201 may include a display as a display device (e.g., the display device 160 of FIG. 1) including the display panel 210.

The electronic device 201 may support a first operating mode and a second operating mode as operating modes of the display. The first operating mode may be referred to as a normal mode. For example, in the first operating mode, a user may execute a web-browser or reproduce a video file by using the electronic device 201. In addition, the user may execute various applications by using the electronic device 201. The second operating mode may be referred to as a low power mode or an AOD mode. For example, in the second operating mode, the electronic device 201 may provide information on a date or time for the user by turning on only some pixels of the display screen. In the second operating mode, the brightness of the electronic device 201 may be lower than the brightness of the electronic device 201 in the first operating mode.

The display panel 210 may output image data under the control of the DDI 230. According to various embodiments, the display panel 210 may be implemented with a thin film transistor liquid crystal display (TFT-LCD) panel, a light-emitting diode (LED) display panel, an organic LED (OLED) display panel, an active-matrix OLED (AMOLED) display panel, a flexible display panel, or the like.

According to some embodiments, the display panel 210 may include at least one pixel, and the at least one pixel may include at least one light emitting diode.

According to certain embodiments, the display panel 210 may be electrically connected with the DDI 230 and the first power regulator 220. The display panel 210 may receive power from the DDI 230 and/or the first power regulator 220. When the power is supplied, a current may be applied to a light emitting diode included in at least one pixel which is specified in response to a data signal transmitted from the DDI 230. When the current flows, the light emitting diode may emit light and the electronic device 201 may provide, for a user, information through the display including the light emitting diode.

According to various embodiments, the display panel 210 may include at least one input terminal for connecting the first power regulator 220 and/or the DDI 230. For example, the display panel 210 may include a first input terminal 21 connected with an anode of the light emitting diode and a second input terminal 22 connected with a cathode of the light emitting diode.

For example, the first power regulator 220 may correspond to the power management module 188 of FIG. 1. According to some embodiments, the first power regulator 220 may be electrically connected with the processor 240, the DDI 230, and the display panel 210. In the present disclosure, the first power regulator 220 may be referred to a power management integrated circuit (PMIC).

According to certain embodiments, the first power regulator 220 may include amplification stages including at least one step. The first power regulator 220 may amplify an input power to a specified value. According to various embodiments, the first power regulator 220 may output at least one power depending on the amplification stages including the at least one step. For example, the first power regulator 220 may output first power and second power different from the first power.

According to some embodiments, the first power regulator 220 may be electrically connected with the first input terminal 21 and/or the second input terminal 22 of the display panel 210. According to certain embodiments, the first power regulator 220 may supply first power to the anode of the light emitting diode included in the display panel 210 through the first input terminal 21 and may supply second power to the cathode of the light emitting diode through the second input terminal 22. According to various embodiments, the first power regulator 220 may supply power to the second power regulator 231 included in the DDI 230.

According to some embodiments, the first power regulator 220 may include a short detection function. The short detection function is a function of forcibly cutting off the supplying of power from the first power regulator 220 when a current having a specified intensity or more is detected from the light emitting diode included in the display panel 210. The short detection function is to prevent an element included in the display panel 210 from being damaged due to a short circuit current.

According to certain embodiments, the current having a specified intensity or greater intensity may be detected by comparing a voltage intensity sensed in the second input terminal 22 with a specified reference voltage intensity. For example, if the voltage intensity sensed in the second input terminal 22 is greater than the specified reference voltage intensity, the short detection function may be executed, and the first power and the second power supplied by the first power regulator 220 may be forcibly cut off. In this case, a current does not flow through the light emitting diode and the screen of the electronic device 201 becomes dark. According to various embodiments, the current having the specified intensity or more may be detected by comparing a current intensity sensed in the second input terminal 22 with the specified reference current intensity.

The DDI 230 may be electrically connected with the processor 240, the first power regulator 220, and the display panel 210. According to various embodiments, the DDI 230 may change data transmitted from the processor 240 into a form capable of being transmitted to the display panel 210 and may transmit the changed data to the display panel 210. The changed data (or display data) may be transmitted in a pixel unit (or a sub-pixel unit). According to some embodiments, the DDI 230 may include the second power regulator 231 and one or more regulators 232, 233, 234, 235, and 236. According to certain embodiments, the one or more regulators 232, 233, 234, 235, and 236 may be low voltage drop out (LDO) regulators.

The second power regulator 231 may receive power from the first power regulator 220 and may amplify the power again or may transform the power to an appropriate power value. The second power regulator 231 may have a role identical to or similar to the role of the first power regulator 220 described above. According to various embodiments, the second power regulator 231 may be electrically connected with one or more regulators 233, 234, and 236.

The one or more regulators 232, 233, 234, 235, and 236 may reduce a voltage value of power amplified by the first power regulator 220 and/or the second power regulator 231 to a specified value. Accordingly, the DDI 230 may supply appropriate power to each terminal (e.g., the first input terminal 21).

According to some embodiments, regulators 232 and 235 may directly receive power from the first power regulator 220 and may change a voltage value of the power. The regulators 232 and 235 may supply power having the changed voltage value to the display panel 210. For example, the first regulator 232 may directly receive power from the first power regulator 220, may change a voltage value of the power, and may supply a first gate voltage to the display panel 210. For another example, the fourth regulator 235 may be electrically connected with the first input terminal 21 of the display panel 210. The fourth regulator 235 may directly receive power from the first power regulator 220 and may supply third power to the anode of the light emitting diode through the first input terminal 21.

According to certain embodiments, the regulators 233, 234, and 236 may directly receive power from the second power regulator 231 and may change a voltage value of the power. The regulators 233, 234, and 236 may supply power having the changed voltage value to the display panel 210. For example, the DDI 230 may supply a second gate voltage to the display panel 210 through the second regulator 233 and may supply an initial voltage to the display panel 210 through the third regulator 234. For another example, the fifth regulator 236 may be electrically connected with the second input terminal 22 and may supply fourth power to a cathode of the light emitting diode through the second input terminal 22.

The processor 240 (e.g., the processor 120 of FIG. 1) may be electrically connected with the first power regulator 220 and the DDI 230. The processor 240 may be electrically connected with components included in the electronic device 201 and may execute arithmetic operations or data processing associated with control and/or communication of the components included in the electronic device 201.

According to various embodiments, the processor 240 may create image data. The image data may refer to data to be output through the display panel 210. For example, the image data may include an image, a text, a moving picture, or the like to be output through the display panel 210. The processor 240 may transmit the created image data to the DDI 230.

According to some embodiments, in the first operating mode, the processor 240 may control the first power regulator 220 such that the display panel 210 outputs first content based on the first power and the second power. The first content may correspond to a web-browser, an image, or a video executed by a user when the electronic device 201 operates in the normal mode.

According to certain embodiments, the first input terminal 21 and the second input terminal 22 of the display panel 210 may receive the first power and the second power by the first power regulator 220 in the first operating mode. In this case, third power and fourth power supplied from the DDI 230 connected with the first input terminal 21 and the second input terminal 22 may be powered off (or cut off).

According to various embodiments, the processor 240 may control the DDI 230 such that the display panel 210 outputs second content based on the third power and the fourth power, in the second operating mode, The second content may be, for example, information on a date or time output by some pixels of a display when the electronic device 201 operates in the AOD mode.

According to some embodiments, the first input terminal 21 and the second input terminal 22 of the display panel 210 may receive the third power and the fourth power from the DDI 230 in the second operating mode. In this case, the first power and the second power supplied from the first power regulator 220 connected with the first input terminal 21 and the second input terminal 22 may be powered off (or cut off).

According to certain embodiments, when an operating mode is switched from the first operating mode to the second operating mode, the processor 240 may perform a control operation such that the power to be supplied to the first input terminal 21 and the second input terminal 22 is seamlessly switched. For example, the processor 240 may perform a control operation such that all of the first power, the second power, the third power, and the fourth power are powered on for a specified time. In this case, the processor 240 may control the first power regulator 220 and the DDI 230 such that the voltage value of the third power is maintained to be higher than the voltage value of the first power and the voltage value of the fourth power is maintained to be higher than the voltage value of the second power. The details thereof will be described with reference to FIG. 4.

According to various embodiments, the specified time may be set to be less than a horizontal blanking interval of the electronic device 201. The horizontal blanking interval may refer to a time spent until a horizontal scan line input to the display panel 210 returns to a time point to scan the first scan line from a time point to scan the last scan line.

According to some embodiments, the specified time may be time corresponding to 12H-sync (horizontal synchronization signal).

According to certain embodiments, the processor 240 may control the first power regulator 220 and the DDI 230 to gradually increase a gamma value in the first operating mode and to switch the operating mode to the second operating mode. The gamma value may be a numeric value used to determine the correlation between the brightness of a signal input to the display panel 210 and the brightness of an image output to a screen of the display panel 210. For example, when the gamma value is 1, the input signal and the output signal may have the same brightness. When the gamma value is greater than 1, the output screen may be more darkly expressed. When the gamma value is smaller than 1, the output screen may be more brightly expressed.

According to various embodiments, if the gamma value is gradually increased before the operating mode is switched from the first operating mode to the second operating mode, the DDI 230 may supply the third power and the fourth power in the state the screen becomes gradually dark. In this case, the load burden to the DDI 230 may be reduced and the operating mode may be seamlessly switched to the second operating mode.

According to some embodiments, the processor 240 may control the DDI 230 such that the clock frequency of the second power regulator 231 is increased for the specified time. The clock frequency is used to determine a period that the second power regulator 231 outputs new output values. For example, if the clock frequency is increased, the second power regulator 231 may output new output values with a shorter period.

According to certain embodiments, when the clock frequency of the second power is increased for the specified time, the third power and the fourth power output from the second power regulator 231 may be supplied to the display panel 210 with more stable values. In this case, a current flowing through the light emitting diode inside the display panel 210 may be maintained with a stable value and the operating mode may be seamlessly switched to the second operating mode. According to various embodiments, the processor 240 may control the DDI 230 to reduce the clock frequency again when the specified time is elapsed.

According to some embodiments, when an operating mode is switched from the second operating mode to the first operating mode, the processor 240 may perform a control operation such that the power supplied to the first input terminal 21 and the second input terminal 22 is seamlessly switched. For example, the processor 240 may control the short detection function of the first power regulator 220 for a specified time such that a current flowing through the light emitting diode is not prevented from being cut off, when the operating mode is switched from the second operating mode to the first operating mode.

According to certain embodiments, the processor 240 may control the short detection function of the first power regulator 220 through the DDI 230. The DDI 230 may transmit a command signal to the first power regulator 220 under the control of the processor 240, such that the state of the short detection function is changed. For example, the DDI 230 may transmit the command signal to the first power regulator 220 in a single wire pulse control scheme. According to various embodiments, the first power regulator 220 may deactivate the short detection function or may change a reference voltage or a reference current for the short detection function after receiving the command signal.

According to some embodiments, when power is switched from the third power to the first power and switched from the fourth power to the second power, the short detection function of the first power regulator 220 may be executed. When the short detection function is executed, the screen of the electronic device 201 may become dark and the switching of the operating mode may not be seamlessly made. Accordingly, the processor 240 may deactivate the short detection function during the specified time. In this case, the electronic device 201 may prevent the display from being dark due to the operation of the short detection function and may seamlessly switch the operating mode to the first operating mode. According to certain embodiments, when the specified time is elapsed, the switching of the operating mode has been finished. Accordingly, the processor 240 may activate the short detection function again.

According to various embodiments, the processor 240 may seamlessly switch the operating mode of the electronic device 201 by changing the reference voltage or the reference current of the short detection function. Details of certain embodiments thereof will be described with reference to the example shown in FIG. 5.

Figure 3:
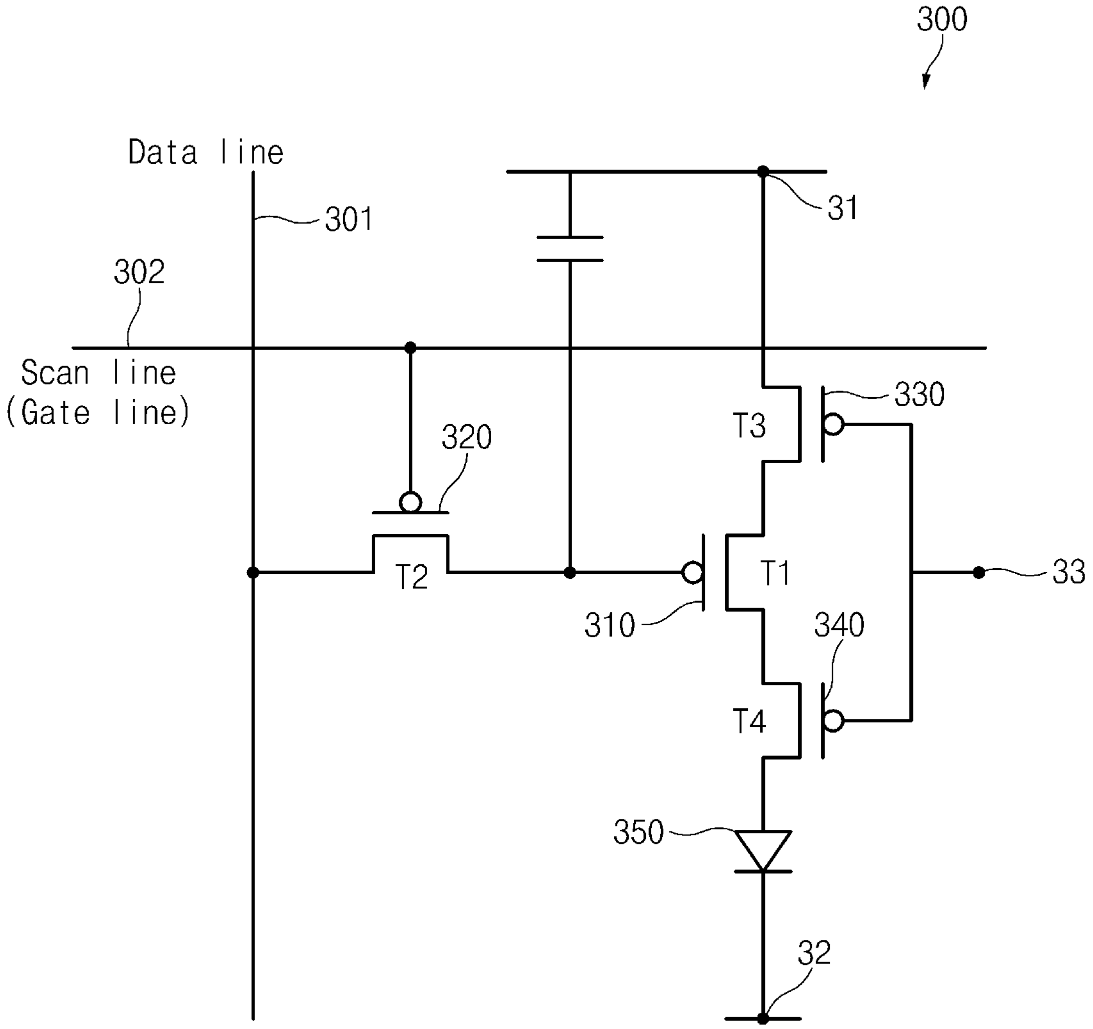
FIG. 3 illustrates, in circuit diagram format, a pixel included in a display panel, according to various embodiments of this disclosure embodiment.

FIG. 3 illustrates, in circuit diagram format, pixels included in a display panel, according to various embodiments of this disclosure.

Referring to the non-limiting example of FIG. 3, a pixel circuit 300 included in a display panel (the display panel 210 of FIG. 2) may include a data line 301, a scan line 302, a first transistor 310, a second transistor 320, a third transistor 330, a fourth transistor 340, a light emitting diode 350, a first input terminal 31, a second input terminal 32, and a third input terminal 330. According to various embodiments, some of the above described components may be omitted from the pixel circuit 300 or some components may be added to the pixel circuit 300. For example, the pixel circuit 300 may further include an input terminal for an initialization signal or one or more transistors.

The data line 301 may refer to a line for transmitting a signal applied through a source driver (not illustrated). In the electronic device (e.g., the second electronic 201 of FIG. 2), the image data may be transmitted to the source driver through the DDI 230 (e.g., the DDI 230 230 of FIG. 2). The source driver may apply the signal to the display panel through the data line 301, based on the image data.

The scan line 302 (or the gate line) may refer to a line for transmitting a signal applied through a scan driver (not illustrated). The image data in the electronic device may be transmitted to the scan driver through the DDI. The scan driver may apply the signal to the display panel through the scan line 302, based on the image data.

The first transistor 310, the second transistor 320, the third transistor 330, and the fourth transistor 340 may control the flow of current in the pixel circuit 300. According to certain embodiments, the first transistor 310, the second transistor 320, the third transistor 330, and the fourth transistor 340 may be turned on or turned off depending on signals input to the respective gate terminals thereof. For example, the second transistor 320 may be turned on depending on a signal applied thereto through the scan line 302 to transmit a signal, which is applied thereto from the data line 301, to the first transistor 310.

According to various embodiments, the light emitting diode 350 may be turned on or turned off depending on a voltage difference between opposition terminals of the light emitting diode 350. For example, when all of the first transistor 310, the third transistor 330, and the fourth transistor 340 are turned on, and when the intensity of a voltage applied to the first input terminal 31 is greater than the intensity of a voltage applied to the second input terminal 32, the light emitting diode 350 may be turned on and the current may flow through the light emitting diode 350. When the current flows through the light emitting diode 350, the light emitting diode 350 may emit light.

According to some embodiments, the light emitting diode 350 may be turned on or off depending on a signal applied from the third input terminal 330. For example, when the first transistor 310 is turned on, and when a signal having a specified duty cycle is applied to the third input terminal 33, a current may flow or may not flow through the light emitting diode 350 depending on the duty cycle of the signal.

According to certain embodiments, when a current having a specified intensity or more flows through the light emitting diode 350, the short detection function of the first power regulator (the first power regulator 220 of FIG. 2) may be executed. When the short detection function is executed, the first power regulator 220 may cut off the power supplied to the first input terminal 31 and the second input terminal 32.

The first input terminal 31 and the second input terminal 32 may be terminals receiving power from the first power regulator 220 and/or the DDI. According to various embodiments, the current flowing through the light emitting diode 350 may be controlled depending on the intensities of power applied to the first input terminal 31 and the second input terminal 32.

The third input terminal 33 may be connected with the gate terminal of the third transistor 330 and the gate terminal of the fourth transistor 340. The third transistor 330 and the fourth transistor 340 may be turned on or off depending on the signal applied to the third input terminal 33. According to some embodiments, the signal applied to the third input terminal 33 may be applied from the processor or may be applied from the DDI 230 in response to the command of the processor.

According to certain embodiments, the processor may control the current flowing through the light emitting diode 350 by changing a signal applied to the third input terminal 33. For example, the processor may reduce the duty cycle of the signal flowing through the third input terminal 33 and thus reduce the intensity of the current.

According to various embodiments, the processor may reduce the intensity of the current flowing through the light emitting diode 350 before the operating mode is switched from the first operating mode to the second operating mode. For example, the processor may reduce the duty cycle of a signal applied to the third input terminal 33 and may reduce the intensity of the current flowing the light emitting diode 350 before the operating mode is switched.

According to some embodiments, when the current flowing through the light emitting diode 350 is reduced, and when the switching is made between the operating modes, the switching between power and power may be seamlessly achieved. For example, the first voltage and the second voltage may be supplied to the first input terminal 31 and the second input terminal 32, respectively, by the first power regulator 220 in the first operating mode. In this case, when the third voltage and the fourth voltage are applied from the DDI 230 in the state that the intensity of the current flowing through the light emitting diode 350 is reduced, since the load burdened to the DDI 230 may be reduced, the switching may be seamlessly made between the power and the power. When the switching is made between the power and the power, the electronic device may seamlessly switch the operating mode from the first operating mode to the second operating mode.

According to certain embodiments, the processor may increase the duty cycle for a current, which flows through the light emitting diode 350 during the specified time, again. Since the switching of the operating mode has been seamlessly made, the electronic device may change the duty cycle to a previous value which is not reduced.

Figure 4:
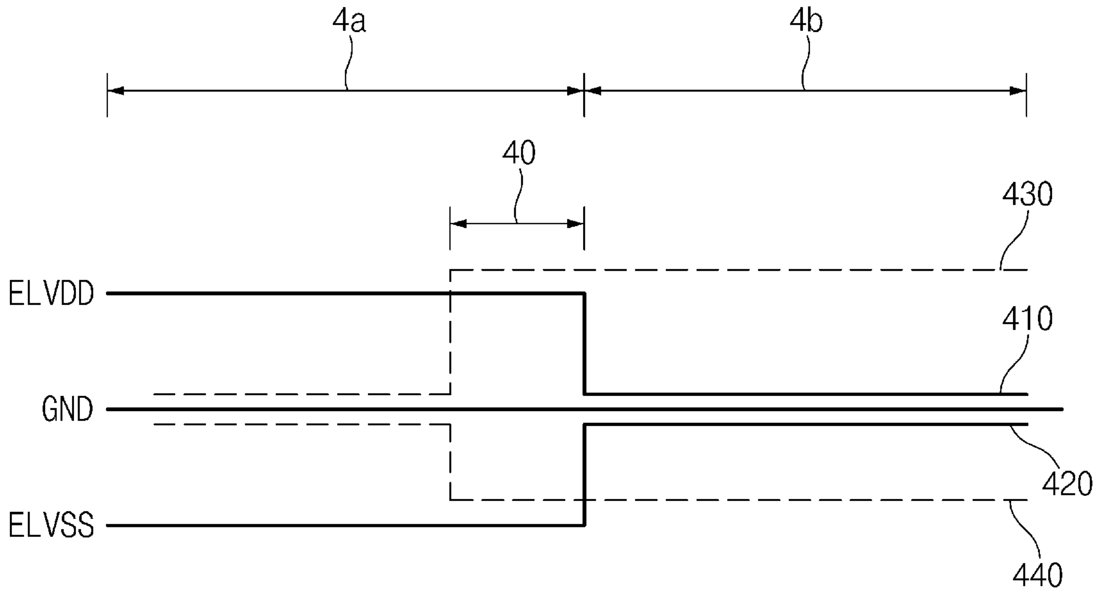
FIG. 4 illustrates changes in a voltage value with time when an electronic device is switched from the first operating mode to the second operating mode, according to certain embodiments.

FIG. 4 illustrates the vibration in a voltage value with time when an electronic device is switched from the first operating mode to the second operating mode, according to various embodiments.

Referring to the non-limiting example of FIG. 4, the figure depicts waveforms of first power 410, second power 420, third power 430, and fourth power 440 input to the first input terminal and the second input terminal of the display panel, when an operating mode is switched from a first operating mode 4*a* to a second operating mode 4*b*. The power of the first input terminal (e.g., the first input terminal 21 of FIG. 2) may be referred to as "ELVDD", and the power of the second input terminal (e.g., the second input terminal 22 of FIG. 2) may be referred to as "ELVSS".

According to some embodiments, it may be understood that the first operating mode 4*a* may be terminated at the time point that the first power 410 and the second power 420 supplied from the first power regulator 220 are cut off. It may be understood that the second operating mode 4*b* starts from the time point that the first power 410 and the second power 420 are cut off.

According to certain embodiments, it may be understood that the duration of the first operating mode 4*a* may include the duration 40 of a specified time. It may be understood that the duration 40 of the specified time is the duration in which all of the first power 410, the second power 420, the third power 430, and the fourth power 440 are turned on. According to various embodiments, the specified time may be set to be less than a horizontal blanking interval. According to some embodiments, the specified time may be time corresponding to 12H-sync.

According to certain embodiments, for the specified time, the voltage value of the third power 430 may be maintained to be higher than the voltage value of the first power 410, and the voltage value of the fourth power 440 may be maintained to be higher than the voltage value of the second power 420. According to various embodiments, when the third power 430, which has a voltage value higher than the voltage value of the first power 410 earlier input to the first input terminal, is input, the voltage value is not reversed in the DDI and thus the power may be smoothly switched. For another example, when the fourth power 440 having a voltage value higher than the voltage value of the second power 420 earlier input to the second input terminal is input, the voltage is not reversed in the DDI, and thus the power may be seamlessly switched.

According to some embodiments, when the supplying of power is seamlessly switched from the first power regulator to the DDI, the electronic device may seamlessly switch the operating mode from the first operating mode 4*a* to the second operating mode 4*b*.

According to certain embodiments, when the specified time is elapsed, the processor may control the first power regulator to cut off the first power 410 and the second power 420. When the first power 410 and the second power 420 are cut off, the display panel may be driven by the third power 430 and the fourth power 440 supplied from the DDI and the electronic device may operate in the second operating mode.

According to various embodiments, the processor may control the DDI such that the voltage value of the third power 430 and the voltage value of the fourth power are reduced, when the specified time is elapsed. The third power 430 is input to be maintained with a voltage value higher than a voltage value of the first power 410 and the fourth power 440 is input to be maintained with a voltage value higher than a voltage value of the second power 420. Accordingly, the processor may reduce the voltage value of the third power 430 and the voltage value of the fourth power 440 such that the third power 430 and the fourth power 440 have voltages values most appropriate to the driving of the display panel.

Figure 5:
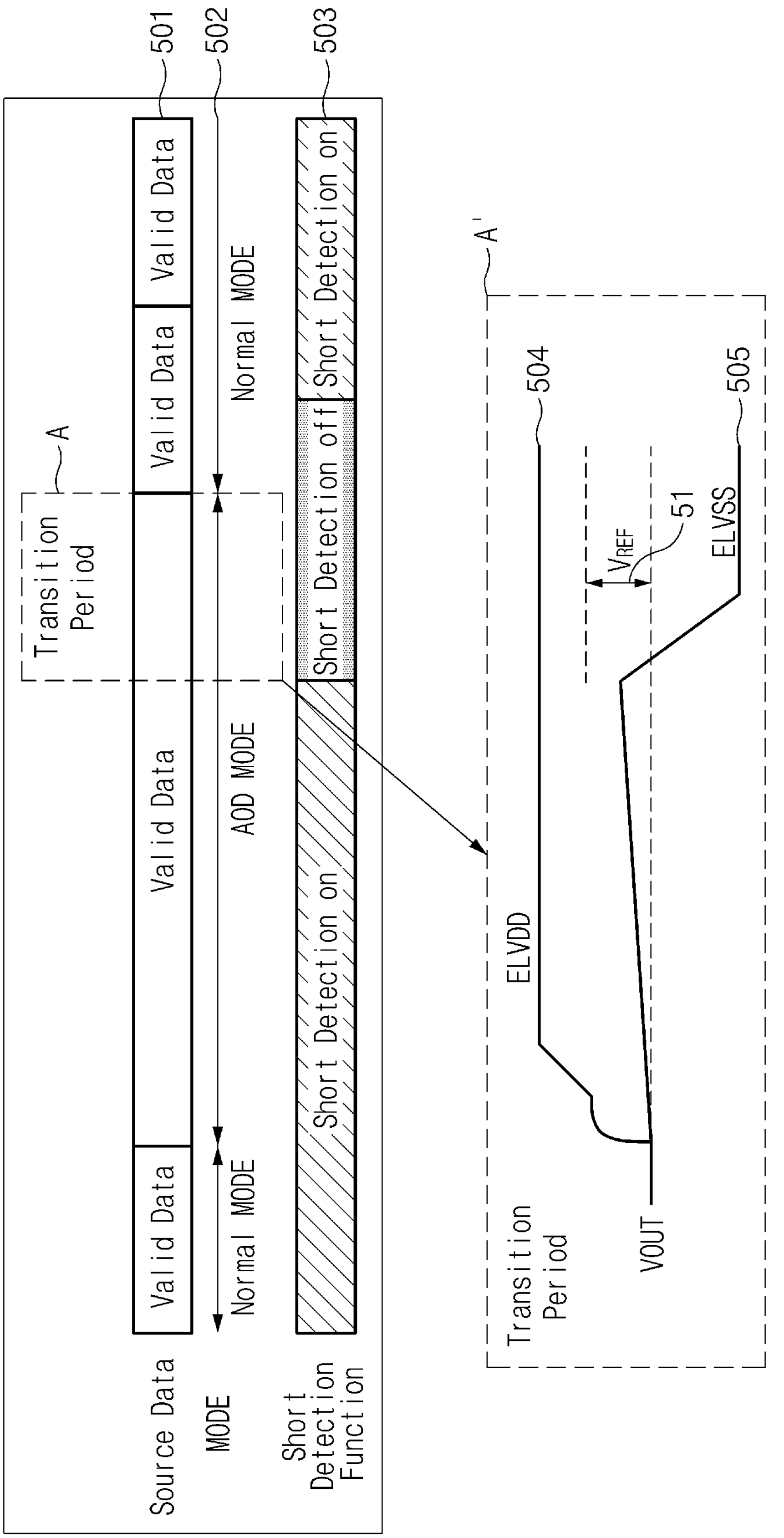
FIG. 5 illustrates operations of a method of controlling short detection function when an electronic device is switched from the second operating mode to the first operating mode, according to various embodiments.

FIG. 5 illustrates operations of a method of controlling short detection function when an electronic device is switched from the second operating mode to the first operating mode, according to some embodiments;

Referring to the non-limiting example of FIG. 5, the figure depicts the activation of the short detection function depending on the operating mode of the electronic device and the voltage graphs of the first input terminal and the second input terminal.

A first graph 501 may show the variation of image data input to the display panel as time is elapsed, and a second graph 502 may show the operating mode of the electronic device as the time is elapsed. The first operating mode may be referred to a normal mode, and the second operating mode may be referred to as an AOD mode.

According to certain embodiments, referring to the first graph 501 and the second graph 502, there may be recognized effective image data distinguished therebetween depending on operating modes. According to various embodiments, the image data may include text data, image data, or video data in the first operating mode. According to some embodiments, the image data may include information on date or time in the second operating mode.

A third graph 503 may show the activation state for the short detection function of the first power regulator in the electronic device according to certain embodiments. According to various embodiments, the short detection function may be deactivated for a specified time when the operating mode is switched from the second operating mode to the first operating mode. According to various embodiments, the deactivation of the short detection function may be directly performed by the processor of the electronic device or may be performed by the DDI in response to the command of the processor.

According to some embodiments, when power from the DDI is switched to the power from the first power regulator, a fine current may flow through the display panel. In this case, when the short detection function has been already activated, the short detection function may be executed due to the fine current. According to certain embodiments, when the electronic device deactivates the short detection function before the operating mode is switched, the electronic device may seamlessly switch the operating mode without making a screen dark due to the execution of the short detection function.

According to various embodiments, the specified time that the short detection function is deactivated is the time that the switching between operating modes is seamlessly performed by the electronic device, and may be experimentally obtained. According to some embodiments, when the switching between operating modes of the electronic device has been completed, the electronic device may activate the short detection function, which is deactivated.

Accordingly, the electronic device may change a reference voltage 51 of the short detection function before switching the operating mode instead of deactivating the short detection function.

It may be understood that a fourth graph 504 and a fifth graph 505 represent voltage intensities of the first input terminal and the second input terminal, respectively, in graph A showing by enlarging an operating mode switching duration (transition period) A of the electronic device.

Referring to the fourth graph 504, according to certain embodiments, the first power and/or the third power may be input to the first input terminal. According to various embodiments, the first power and the third power may represent voltages having positive values.

Referring to the fifth graph 505, according to some embodiments, the second power and/or the fourth power may be input to the second input terminal. According to certain embodiments, the second power and the fourth power may represent voltages having negative values. According to various embodiments, the voltage supplied to the second input terminal may temporarily have a positive value in the operating mode switching duration.

According to some embodiments, when the voltage supplied to the second input terminal is greater than the reference voltage 51, the short detection function of the first power regulator may be executed. According to certain embodiments, the electronic device may increase the reference voltage 51 of the short detection function for a specified time. Accordingly, the electronic device may seamlessly switch the operating mode without making the screen dark due to the execution of the short detection function.

According to various embodiments, when the specified time is elapsed, the electronic device may reduce the reference voltage 51 of the short detection function since the switching of the operating mode is finished.

Figure 6:
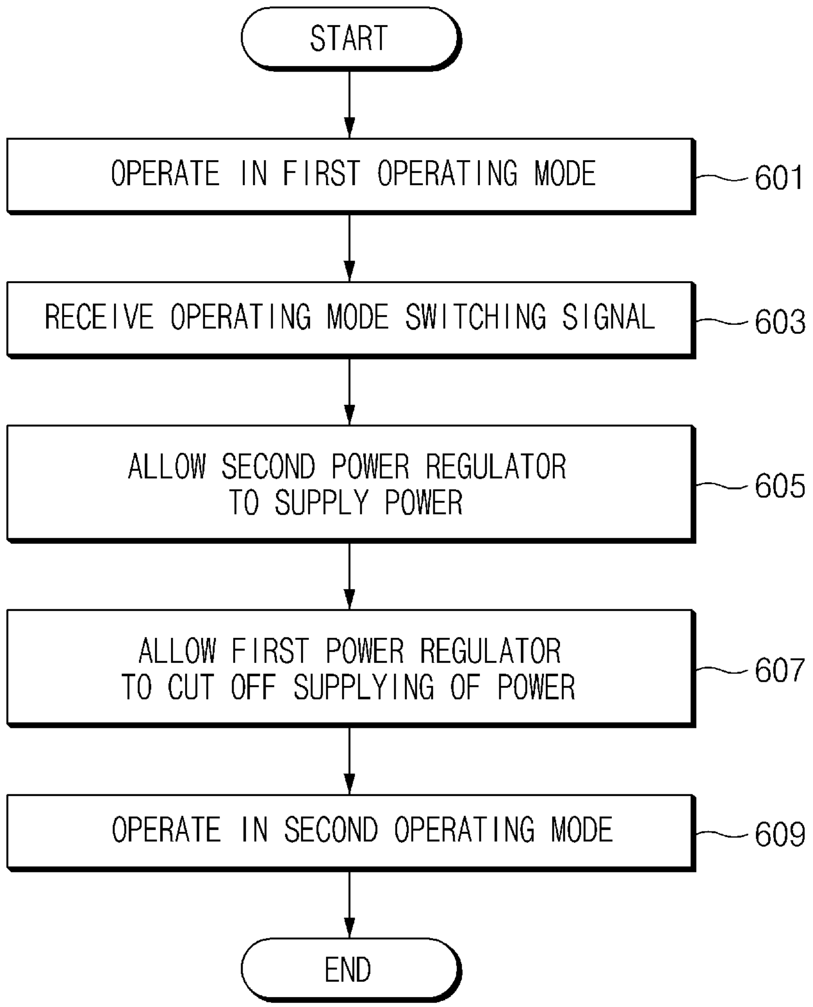
FIG. 6 illustrates operations of a method for switching from the first operating mode to the second operating mode by an electronic device, according to various embodiments.

FIG. 6 illustrates operations of a method for the switching from the first operating mode to the second operating mode by an electronic device, according to some embodiments.

Referring to the non-limiting example of FIG. 6, according to certain embodiments, an operation that the electronic device switches from the first operating mode to the second operating mode may include operation 601 to operation 609. Operation 601 to operation 609 may, in certain embodiments, be performed by the processor 120 of FIG. 1.

In operation 601, according to various embodiments, the electronic device may operate in the first operating mode. The first operating mode may be referred to as a normal mode. In the first operating mode, a user may execute a web-browser or reproduce a video file, or execute other applications. According to some embodiments, an electronic device operating in the first operating mode may turn on all pixels of the display panel. The display panel may receive the first power and the second power from the first power regulator.

In operation 603, according to certain embodiments, the processor of the electronic device may receive an operating mode switching signal. For example, when the user presses a power button of the electronic device, the operating mode switching signal may be transmitted to the processor. According to various embodiments, operation 603 may be omitted. For example, if an input by the user is not made for a specified time, the processor may perform operation 605 after the specified time elapses.

In operation 605, according to some embodiments, the electronic device may control the second power regulator to supply power to the display panel. The second power regulator may supply the third power and/or the fourth power to the display panel. According to certain embodiments, the first power and/or the second power may be supplied to the display panel by the first power regulator during the time that the third power and/or the fourth power are supplied. In this case, for the specified time, the voltage value of the third power may be maintained to be higher than the voltage value of the first power, and the voltage value of the fourth power may be maintained to be higher than the voltage value of the second power. The power supplied to the display panel may be seamlessly switched, and the electronic device may seamlessly switch the operating mode from the first operating mode to the second operating mode, by performing operation 605.

In operation 607, according to various embodiments, the electronic device may control the first power regulator to stop supplying power to the display panel. When the specified time is elapsed in operation 605, the first operating mode is stopped. Accordingly, the first power and the second power supplied from the first power regulator may be cut off.

In operation 609, according to some embodiments, the electronic device may operate in the second operating mode. In this case, the display panel may receive power only by the second power regulator.

Figure 7:
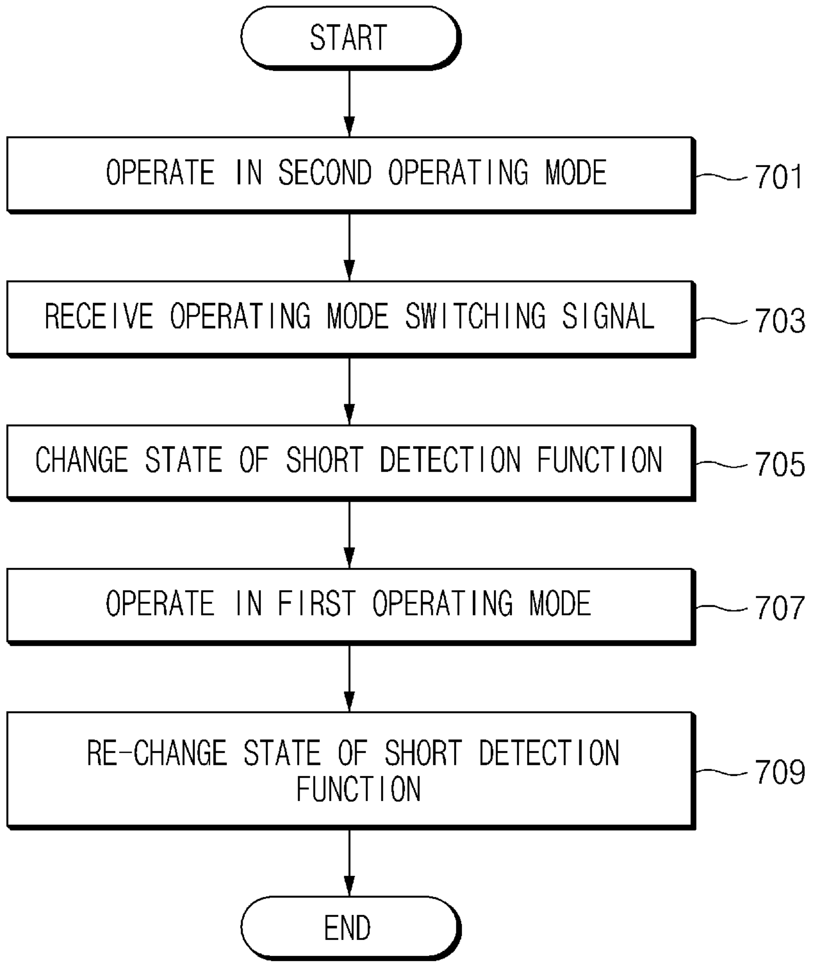

FIG. 7 illustrates operations of a method for switching from the second operating mode to the first operating mode by an electronic device, according to certain embodiments.

Referring to the non-limiting example of FIG. 7, according to various embodiments, an operation that an electronic device switches from the second operating mode to the first operating mode may include operation 701 to operation 709. Operation 701 to operation 709 may be performed by the processor 120 of FIG. 1.

In operation 701, according to some embodiments, the electronic device may operate in the second operating mode. The second operating mode may be referred to as an AOD mode. In the second operating mode, the electronic device may provide information on a date or time for a user by employing only some pixels of the display panel. According to certain embodiments, the display panel may receive the third power and the fourth power by the second power regulator included in the DDI.

In operation 703, according to various embodiments, the processor of the electronic device may receive the operating mode switching signal. For example, when the user presses a power button of the electronic device, the operating mode switching signal may be transmitted to the processor.

In operation 705, according to some embodiments, the electronic device may change the state of the short detection function. For example, the electronic device may deactivate the short detection function for a specified time. For another example, the electronic device may change a reference voltage or a reference current for the short detection function. The change in the state of the short detection function may be implemented directly by the processor or through the DDI. The power supplied to the display panel may be seamlessly switched, and the electronic device may seamlessly switch the operating mode from the second operating mode to the first operating mode, by performing operation 705.

In operation 707, according to certain embodiments, the electronic device may operate in the first operating mode. In this case, the electronic device may control the second power regulator to stop supplying the power to the display panel and the display panel may receive power only by the first power regulator.

In operation 709, according to various embodiments, the electronic device may re-change the state of the short detection function. For example, the electronic device may activate the short detection function or may re-change the reference voltage or the reference current. The re-change in the state of the short detection function is to prevent the damage to an element due to a short current, which is an original object of the short detection function, since the switching of the operating mode has been finished.

According to various embodiments of this disclosure, in the electronic device (e.g., the electronic device 101 of FIG. 1) having at least two display operating modes distinguished therebetween, the switching between the operating modes may be seamlessly performed. For example, when the screen of the electrode device is switched from the AOD screen to a normal mode screen (e.g., the lock screen), the screen switching is naturally achieved without flickering of a black screen.

In addition, the switching between power and power may be seamlessly performed when the switching between the operating modes is made. Accordingly, the probability of outputting an abnormal screen to the display of the electronic device may be reduced. For example, even if the AOD screen is set to a higher-brightness AOD screen, when a normal mode screen is switched to the AOD screen, the AOD screen may be stably output without outputting the abnormal screen.

According to some embodiments, an electronic device may include a display panel including at least one pixel including at least one light emitting diode, a first power regulator to supply first power to an anode of the at least one light emitting diode and to supply second power to a cathode of the at least one light emitting diode, and a display driver integrated circuit (DDI) including a second power regulator to supply third power to the anode of the at least one light emitting diode and to supply fourth power to the cathode of the at least one light emitting diode, and electrically connected with the first power regulator, and a processor electrically connected with the first power regulator and the DDI. The processor may control the first power regulator such that the display panel outputs first content based on the first power and the second power, in a first operating mode, may control the DDI such that the display panel outputs second content different from the first content based on the third power and the fourth power, in a second operating mode, and may control the first power regulator and the DDI such that a voltage value of the third power is maintained to be higher than a voltage value of the first power, and a voltage value of the fourth power is maintained to be higher than a voltage value of the second power for at least specified time, when an operating mode is switched from the first operating mode to the second operating mode.

According to certain embodiments, the processor may control the first power regulator to cut off the first power and the second power, when the at least specified time is elapsed.

According to various embodiments, the processor may control the DDI to reduce the voltage value of the third power and the voltage value of the fourth power, when the at least specified time is elapsed.

According to some embodiments, the processor may reduce a duty cycle for a current flowing through the at least one light emitting diode, before the operating mode is switched from the first operating mode to the second operating mode.

According to certain embodiments, the processor may increase the duty cycle for the current flowing through the at least one light emitting diode for the at least specified time.

According to various embodiments, the processor may control the first power regulator and the DDI to gradually increase a gamma value in the first operating mode and to switch the operating mode from the first operating mode to the second operating mode.

According to some embodiments, the processor may control the DDI to increase a clock frequency of the second power regulator for the at least specified time.

According to certain embodiments, the processor may control the DDI to decrease the clock frequency of the second power regulator, when the at least specified time is elapsed.

According to various embodiments, the at least specified time may be less than a horizontal blanking interval of the electronic device. According to some embodiments, the at least specified time may be time corresponding to a 12 horizontal synchronization (12-H sync) signal.

According to certain embodiments, an electronic device may include a display panel including at least one pixel including at least one light emitting diode, a first power regulator to supply first power to an anode of the at least one light emitting diode and to supply second power to a cathode of the at least one light emitting diode, a DDI including a second power regulator to supply third power to the anode of the at least one light emitting diode and to supply fourth power to the cathode of the at least one light emitting diode, and electrically connected with the first power regulator, and a processor electrically connected with the first power regulator and the DDI. The processor may control the first power regulator such that the display panel outputs first content based on the first power and the second power, in a first operating mode, may control the DDI such that the display panel outputs second content different from the first content based on the third power and the fourth power, in a second operating mode, and may control a short detection function of the first power regulator for specified time to prevent a current flowing through the at least one light emitting diode from being blocked, when an operating mode is switched from the second operating mode to the first operating mode.

According to various embodiments, the processor may deactivate the short detection function for the specified time. According to some embodiments, the processor may activate the short detection function when the specified time is elapsed.

According to certain embodiments, the processor may increase a reference voltage or a reference current of the short detection function for the specified time. According to various embodiments, the processor may decrease the reference voltage or the reference current of the short detection function when the specified time is elapsed.

According to some embodiments, a method of switching an operating mode of an electronic device may include supplying, by a first power regulator, first power and second power to a display panel to output first content, in a first operating mode, supplying, by a DDI, third power and fourth power to the display panel to output second content, in a second operating mode, maintaining a voltage value of the third power to be higher than a voltage value of the first power and maintaining a voltage value of the fourth power to be higher than a voltage value of the second power, for a specified time, when the operating mode is switched from the first operating mode to the second operating mode, and cutting off the first power and the second power when the specified time is elapsed.

According to certain embodiments, the method may further include reducing a duty cycle for a current flowing through at least one light emitting diode, before the operating mode is switched from the first operating mode to the second operating mode.

According to various embodiments, the method may further include gradually increasing a gamma value of the electronic device before the operating mode is switched from the first operating mode to the second operating mode.

According to some embodiments, the method may further include increasing a clock frequency of the DDI for the specified time.

According to certain embodiments, the method may further include controlling a short detection function of the first power regulator when the operating mode is switched from the second operating mode to the first operating mode.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to various embodiments of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 140) including an instruction stored in a machine-readable storage media (e.g., an internal memory 136 or an external memory 138) readable by a machine (e.g., a computer). The machine may be a device that calls the instruction from the machine-readable storage media and operates depending on the called instruction and may include the electronic device (e.g., the electronic device 101). When the instruction is executed by the processor (e.g., the processor 120), the processor may perform a function corresponding to the instruction directly or using other components under the control of the processor. The instruction may include a code generated or executed by a compiler or an interpreter. The machine-readable storage media may be provided in the form of non-transitory storage media. Here, the term “non-transitory”, as used herein, is a limitation of the medium itself (i.e., tangible, not a signal) as opposed to a limitation on data storage persistency.

According to some embodiments, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a PLAY STORE™). In the case of online distribution, at least a portion of the computer program product may be temporarily stored or generated in a storage medium such as a memory of a manufacturer’s server, an application store’s server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:

a display panel including at least one pixel including at least one light emitting diode;

a first power regulator to supply first power to an anode of the at least one light emitting diode and to supply second power to a cathode of the at least one light emitting diode;

a display driver integrated circuit (DDI) including a second power regulator to supply third power to the anode of the at least one light emitting diode and to supply fourth power to the cathode of the at least one light emitting diode, and electrically connected with the first power regulator; and a processor electrically connected with the first power regulator and the DDI, wherein the processor is configured to:

control the first power regulator such that the display panel outputs a first content based on the first power and the second power, in a first operating mode;

control the DDI such that the display panel outputs a second content different from the first content based on the third power and the fourth power, in a second operating mode; and control the first power regulator and the DDI such that a voltage value of the third power and the fourth power is adjusted for at least a specified time, when an operating mode is switched from the first operating mode to the second operating mode.

2. The electronic device of claim 1, wherein the processor is configured to:

control the first power regulator to cut off the first power and the second power, when at least the specified time is elapsed.

3. The electronic device of claim 1, wherein the processor is configured to:

control the DDI to reduce the voltage value of the third power and the voltage value of the fourth power, when at least the specified time is elapsed.

4. The electronic device of claim 1, wherein the processor is configured to:

reduce a duty cycle for a current flowing through the at least one light emitting diode, before the operating mode is switched from the first operating mode to the second operating mode.

5. The electronic device of claim 4, wherein the processor is configured to:

increase the duty cycle for the current flowing through the at least one light emitting diode for at least the specified time.

6. The electronic device of claim 1, wherein the processor is configured to:

control the first power regulator and the DDI to gradually increase a gamma value in the first operating mode and to switch the operating mode from the first operating mode to the second operating mode.

7. The electronic device of claim 1, wherein the processor is configured to: control the DDI to increase a clock frequency of the second power regulator for at least the specified time.

8. The electronic device of claim 7, wherein the processor is configured to: control the DDI to decrease the clock frequency of the second power regulator, when at least the specified time is elapsed.

9. The electronic device of claim 1, wherein the specified time is less than a horizontal blanking interval of the electronic device.

10. The electronic device of claim 1, wherein the specified time is time corresponding to a 12 horizontal synchronization (12-H sync) signal.

11. An electronic device comprising:

a display panel including at least one pixel including at least one light emitting diode;

a first power regulator to supply first power to an anode of the at least one light emitting diode and to supply second power to a cathode of the at least one light emitting diode;

a display driver integrated circuit (DDI) including a second power regulator to supply third power to the anode of the at least one light emitting diode and to supply fourth power to the cathode of the at least one light emitting diode, and electrically connected with the first power regulator; and a processor electrically connected with the first power regulator and the DDI, wherein the processor is configured to:

control the first power regulator such that the display panel outputs a first content based on the first power and the second power, in a first operating mode;

control the DDI such that the display panel outputs a second content different from the first content based on the third power and the fourth power, in a second operating mode; and control a short detection function of the first power regulator for a specified time, when an operating mode is switched from the second operating mode to the first operating mode.

12. The electronic device of claim 11, wherein the processor is configured to:

deactivate the short detection function for the specified time.

13. The electronic device of claim 12, wherein the processor is configured to:

activate the short detection function when the specified time is elapsed.

14. The electronic device of claim 11, wherein the processor is configured to:

increase a reference voltage or a reference current of the short detection function for the specified time.

15. The electronic device of claim 14, wherein the processor is configured to:

decrease the reference voltage or the reference current of the short detection function when the specified time is elapsed.

16. A method of switching an operating mode of an electronic device, the method comprising:

supplying, by a first power regulator, first power and second power to a display panel to output first content, in a first operating mode;

supplying, by a display driver integrated circuit (DDI), third power and fourth power to the display panel to output second content, in a second operating mode;

adjusting voltage values of the third power and the fourth power for a specified time, when the operating mode is switched from the first operating mode to the second operating mode; and cutting off the first power and the second power when the specified time is elapsed.

17. The method of claim 16, further comprising:

reducing a duty cycle for a current flowing through at least one light emitting diode, before the operating mode is switched from the first operating mode to the second operating mode.

18. The method of claim 16, further comprising:

gradually increasing a gamma value of the electronic device before the operating mode is switched from the first operating mode to the second operating mode.

19. The method of claim 16, further comprising:

increasing a clock frequency of the DDI for the specified time.

20. The method of claim 16, further comprising:

controlling a short detection function of the first power regulator when the operating mode is switched from the second operating mode to the first operating mode.

* * * * *